US008743051B1

(12) United States Patent
Moy et al.

(10) Patent No.: US 8,743,051 B1
(45) Date of Patent: Jun. 3, 2014

(54) MIRROR DETECTION-BASED DEVICE FUNCTIONALITY

(75) Inventors: Steven Ka Cheung Moy, San Francisco, CA (US); Kah Kuen Fu, Sunnyvale, CA (US); Volodymyr V. Ivanchenko, Mountain View, CA (US); Gunnar Hovden, Los Gatos, CA (US)

(73) Assignee: Amazon Technologies, Inc., Reno, NV (US)

( * ) Notice: Subject to any disclaimer, the term of this patent is extended or adjusted under 35 U.S.C. 154(b) by 138 days.

(21) Appl. No.: 13/237,752

(22) Filed: Sep. 20, 2011

(51) Int. Cl.
*G09G 5/00* (2006.01)
(52) U.S. Cl.
CPC ........................................ *G09G 5/00* (2013.01)
USPC .......................................................... 345/156
(58) Field of Classification Search
None
See application file for complete search history.

(56) References Cited

U.S. PATENT DOCUMENTS

| 6,124,647 A * | 9/2000 | Marcus et al. ............... 307/10.1 |
| 2010/0292886 A1 * | 11/2010 | Szczerba et al. ................ 701/29 |

* cited by examiner

*Primary Examiner* — David D Davis
(74) *Attorney, Agent, or Firm* — Novak Druce Connolly Bove + Quigg LLP

(57) ABSTRACT

An electronic device automatically reverses a left-right orientation of content displayed by the device when detecting that a user is viewing content of the device via a mirror. Some embodiments reverse the content upon detecting a trigger such as a reflection of an image displayed by the device, indicating that the device is displaying content against a mirror. In some embodiments, the device reverses the content upon detecting that blinking markers displayed by the device are inverted or upon detecting a blinking marker flashing in a particular pattern consistent to that emitted by the device. Some embodiments reverse the content upon detecting both the reflection of the image and a reflection of the user. Further, some embodiments reverse the content upon determining that the user is facing a mirror and switches back to its normal orientation when the user is viewing the content by directly looking at the device.

33 Claims, 10 Drawing Sheets

MIRROR DETECTION-BASED DEVICE FUNCTIONALITY

BACKGROUND

People are increasingly utilizing portable electronic devices for a number and variety of tasks, including reading articles, watching the news, communicating with others, looking at photos, and conducting meetings. In order to save time, people often perform various other tasks while reading or watching content displayed by the electronic devices. For instance, a user may use one hand to hold a cell phone in watching the news while using the other hand to shave or brush his or her teeth as the user is getting ready for work. However, not only does this prevent the user from having an extra hand in getting ready, the user may easily get toothpaste or shaving cream on the device.

One conventional solution involves enabling the user to read or watch content displayed on an electronic device by using the reflection in a mirror as the user gets ready for work. However, the user must keep in mind that the content that is being watched or read from the reflection in the mirror is flipped due to the minor image effect. Further, when the user wants to read textual content off of the device, the user must turn away from the mirror and stop what the user is currently doing to face the screen of the device to be able to read the displayed text, as the reversed text is often not easily decipherable by the user.

BRIEF DESCRIPTION OF THE DRAWINGS

Various embodiments in accordance with the present disclosure will be described with reference to the drawings, in which.

DETAILED DESCRIPTION

Figure 1A:
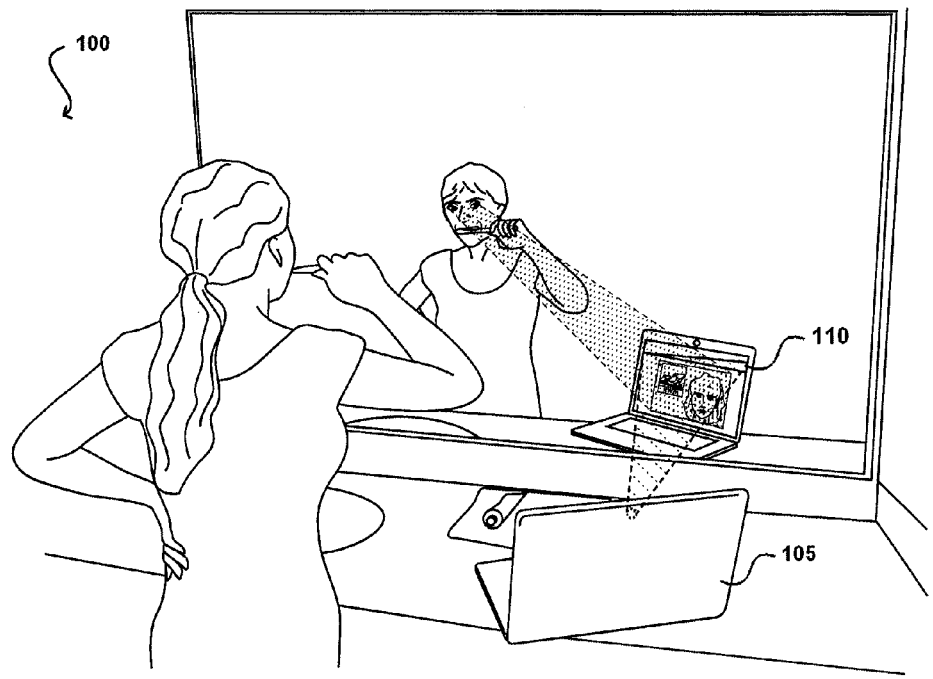
FIGS. 1(a)-1(b) illustrate example environment in which an electronic device may reverse content displayed on a display screen of the device upon determining that a user of the device is viewing content of the device through a reflective surface in accordance with various embodiments.

Systems and methods in accordance with various embodiments of the present disclosure may overcome one or more of the aforementioned and other deficiencies experienced in conventional approaches to viewing content displayed by an electronic device. In particular, various embodiments enable the electronic device to reverse or otherwise change the orientation of content (e.g., video or still images) that is displayed on a display screen of the device when a user of the device desires to view the device's content via a reflective surface (e.g., a mirror). For instance, the user of the device may want to watch the morning news while getting ready (e.g., brushing teeth, shaving, putting on makeup) in front of the mirror. The device of some embodiments is operable to detect the mirror, the presence of the user in the mirror, and/or other such information, and as appropriate is operable to reverse or flip the content of the device. Such operation can enable the user to conveniently use the mirror for tasks such as watching the morning news while at the same time preparing for the day as the user remains in a particular orientation (i.e., at least partially facing the mirror).

In some embodiments, a computing device enables a user to select a selectable user interface (UI) item on the device in order to manually reverse or flip the content displayed by the device. The content is flipped by reversing the left-right orientation of the content displayed by the device in some embodiments. Methods for flipping the content or reversing the left-right orientation of the content are well known in the art and will not be discussed herein in detail. The content displayed by the device is a graphical representation of objects and/or information for display on a display element (e.g., a display screen) of the device. It should be understood that the content may include a single image, multiple images, or other various types of video images, etc.

Some embodiments enable the device to automatically reverse its content upon determining that the user is viewing the content of the device through a reflective surface. Different embodiments may perform this determination differently. In some embodiments, a computing device determines that a viewer is viewing the content of the device via a reflective surface by detecting one or more triggers or triggering events. For instance, the device may automatically reverse its content upon detecting the reflection of a two-dimensional object or image displayed from the display screen of the device, the detection of the reflection of the two-dimensional image being the trigger. In another instance, the device may automatically reverse its content upon detecting the reflection of the viewer and/or the reflection of the two-dimensional image projected from the device. In other words, in order for the device to automatically perform a content flip, the device of some embodiments must detect both triggers—detection of the reflection of the viewer and detection of the reflection of the two-dimensional image. Some embodiments may automatically switch back to its normal or default display orientation upon detection of another type of trigger or when the device no longer detects the trigger(s) that initially caused the device to reverse its content.

In some instances, the trigger may be detection of a temporal display instead of the detection of a reflected image. The device of some embodiments may detect one or more blinking lights (e.g., a small blinking square) emitted from the device to determine whether content of the device is being reflected via a reflective surface. Some embodiments perform a spatiotemporal analysis of two or more blinking markers to determine whether the blinking markers are reversed due to the mirroring effect. Upon detecting the trigger or detecting the reversed blinking markers, the device of some embodiments reverses its content.

Oftentimes, enabling the device to be able to reverse the content or content image(s) is desirable as the user may be unable to have direct visual contact with the screen of the device. In circumstances where the user is performing an activity that requires the user to face a particular direction (e.g., shaving his face, brushing her teeth, painting a wall, cooking in the kitchen), the device of some embodiments may automatically reverse the content such that the user may watch the content in its proper orientation when watching via a reflective surface (e.g., a mirror directly in front of or to the side of the viewer, a glass window, a plastic surface, or any type of surface that may reflect images) while performing the activity at the same time.

Further, in some situations where the user may place the device in a location that would keep the device from getting dirty, it may be difficult for the user to look directly at the screen of the device. Some embodiments may reverse and/or enlarge the content of the device such that the user may watch the content of the device using a reflective surface while having the device placed at a distance away from the user. For instance, the user may place his laptop on a cabinet behind him in the bathroom instead of the counter to avoid splashing water onto the device. In another instance, the user may place a computing device at a distance away from the user while painting the house or washing the dishes to avoid splashes onto the screen. While performing these activities, the user may watch the content of the device in its proper orientation using the reflective surface without having to worry about the condition of the device.

In some embodiments, the electronic device that may perform the content-flip function may be a personal computer, desktop computer, laptop computer, tablet computer, mobile phone, smartphone, media player, personal digital assistant (PDA), electronic book reading devices, etc. As mentioned, the method in which the device may perform the content-flip function is well known in the art and will not be discussed here. The electronic device of some embodiments may automatically reverse its content upon determining that the user is viewing the content of the device through a reflective surface. In some embodiments, the user may activate a auto-detection mode (e.g., by selecting a selectable UI item) that enables the device to use various mechanisms in determining whether content is being reflected across a reflective surface for viewers. Some embodiments determine that content is being reflected across the reflective surface for viewers upon detection of one or more triggers in the device's environment.

Many other alternatives and variations are described and suggested below in relation to at least some of the various embodiments.

Figure 1B:
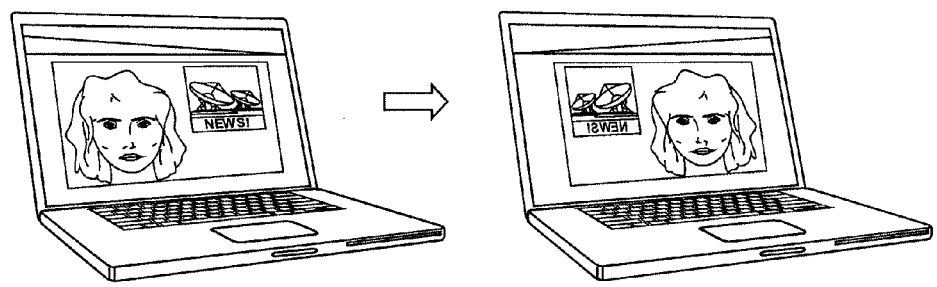

FIGS. 1(a)-1(b) illustrate an example environment 100 in which an electronic device may reverse the content displayed on a display screen of the device upon determining that a user of the device is viewing the content of the device through a reflective surface. As mentioned above, some embodiments determine that the user is viewing content (e.g., still images or video images) of the device through a reflective surface (e.g., a mirror) by detecting one or more triggers. FIG. 1(a) illustrates an example situation that may cause the device to automatically reverse (e.g., flip about a center vertical axis of the display) the content displayed on the display element of the device such that a viewer of a reflection of the display may watch the content of the display (e.g., through a reflective surface) as if the viewer were watching the content in a normal setting (e.g., when the user is watching the content of a device by directly looking at the device as opposed to watching the reflected content through a reflective surface). Although a particular environment (e.g., a bathroom) is depicted here for purposes of explanation, different environments may be used, as appropriate, to implement various embodiments.

In FIG. 1(a), the device of some embodiments determines whether to reverse a content by detecting a reflection of a two-dimensional image. In some embodiments, the device displays or projects a two-dimensional image when the auto-detection mode is activated. The two-dimensional image may be a visible bar with varying (e.g., increasing or decreasing) thickness from left to right displayed across the display screen of the device. In some embodiments, the two-dimensional image has a unique pattern (e.g., a signature for the device) that enables the device to easily detect whether the two-dimensional image has been flipped. Having a unique two-dimensional image with a distinct pattern may prevent the device from detecting false-positives or mistaking other patterns in the environment (e.g., an image of a cat) or other images projected by other devices for the reflection of the unique two-dimensional image.

As mentioned, the device of some embodiments determines whether the device is placed approximately across from a reflective surface by detecting the reflected two-dimensional image (e.g., image with a distinct pattern). In some embodiments, the device may scan the environment using one or more imaging elements (e.g., cameras) on the device and perform image recognition (e.g., using an image/object recognition algorithm) in order to determine whether there is a reflection of the two-dimensional image. The device may determine that the device is being placed across from a reflective surface when one of the detected images is identified as a reflection of the two-dimensional image (i.e., a bar with a pattern of increasing thickness). Some embodiments identify an image within the captured images as a reflection of the two-dimensional image by accounting for image distortion, misalignment of the phone with respect to the mirror planes, image scaling, etc.

The image recognition algorithm may analyze the pixels captured and assign a probability for each pixel that may correspond to the reversed image. After factoring in image distortion, scaling, etc., some embodiments may determine that a portion within the captured image is the reversed image with a certain probability. In some embodiments, the device determines that the image within the captured images is a reflection when the probability exceeds a threshold. In some embodiments, the device may scan an area within the environment or region of interest corresponding to an area upon which the content on the device may be reflected when content is being displayed by the display screen of the device (e.g., an area within 30° to 150° with respect to the display screen of the device). This enables the image recognition algorithm to only have to analyze image data corresponding to that region, which can significantly reduce the amount of processing needed for images, particularly for high resolution, full color images.

In some embodiments, the device projects a two-dimensional image or identifier that is not easily detectable by human users (e.g., invisible), such as a digital watermark. The device of some embodiments may then determine that the device is being placed across from a reflective surface (e.g., facing the reflective surface) by detecting a reflection of the image or identifier from the surface. Some embodiments detect the reflection of the image or identifier by capturing image information from the device's surroundings and analyzing the image information by using an appropriate image analysis algorithm. In some embodiments, the device may project a temporal display (e.g., displaying blinking light or markers in a predetermined temporal sequence) on a display element of the device or using one or more LEDs on the device. Some embodiments may determine that the device is being place across from a reflective surface when the device detects one or more blinking lights in a distinctive pattern consistent to the pattern in which the lights are being flashed from the device.

Further, some embodiments may determine that content of the device is being reflected via a reflective surface by displaying or projecting two or more blinkers (e.g., blinking dots). Some embodiments emit blinking markers of different wavelengths. For example, one blinking marker may be green and another blinking marker may be red. Also, some embodiments may emit wavelengths that are not visible to the human eye. In some embodiments, the device uses a spatiotemporal analysis algorithm to determine whether the blinking markers are inverted, which may indicate that the detected blinking markers are reflections from a reflective surface. The spatiotemporal analysis algorithm may determine an approximate translation between two video frames and then correct for visual jitter by shifting one of the video frames. Some embodiments subtract the two frames to determine the blinking parts. In some embodiments, the blinking parts may also indicate the location of the device emitting the temporal display and where its flash is situated.

Some embodiments analyze the timing and the location of the blinking markers to determine whether the blinking markers have been inverted. In one instance, if the captured timing of the blinking markers is at distinctive intervals consistent with the timing of the device emitting the blinking markers, some embodiments may determine that the content is being reflected via a reflective surface. In another instance, if the location of the blinking markers is reversed or inverted compared to the orientation of the blinking markers displayed by the device (e.g., displaying a red blinking light to the right of a green blinking light), some embodiments may determine that the content of the device is being reflected. This is a reliable and robust scheme because blinking can be synchronized (on the emitting and the receiving end) and accumulated over multiple frames.

The electronic device may use one or more imaging elements on the device to capture image information from the device's surroundings. The imaging element may be a camera, an infrared sensor, or other such device. In some embodiments, the imaging element is placed on the same side of the device (e.g., a front-facing camera) as the display element (i.e., the display screen of the device), such that the imaging element may capture image information in an area where the content may be reflected (e.g., such that the imaging element may capture image information from the 0° to 180° range of the display screen of the device).

In FIG. 1(a), the device 105 determines to reverse the content displayed on the display element upon detection of a reflection of a two-dimensional image 110. Here, the two-dimensional image is displayed when the auto-detection mode of the device has been activated (e.g., by selecting a button on the device). The two-dimensional image in this instance includes a particular pattern that enables one to distinguish a left-right orientation of the image. Upon detection of the reflection of this two-dimensional image with the particular pattern (e.g., using a front camera on the device), the device reverses the content being displayed on the device, such as that being shown in FIG. 1(b). By reversing the left-right orientation of the content, the device may display content that, when reflected by a reflective surface (e.g., a mirror), the viewer may view the content in its normal left-right orientation.

Some embodiments enable the device to use various other mechanisms to verify that the device is being placed against a mirror (i.e., the display is being reflected from a mirror for a viewer). In one instance, the device enters a verification stage after detecting a reflection of the two-dimensional image displayed by the device. The verification stage of some embodiments enables the device to ensure that the device is being placed against a mirror by displaying the same two-dimensional image, by displaying another image, or by performing a flash or blinking lights that causes a certain type of reflection in the mirror. The device may then detect and analyze the reflection (e.g., using an image recognition algorithm) to verify whether the device is being placed against a mirror. While the device in this instance performs a flash to cause a certain type of reflection in the mirror, the device in other instances may flash a light emitting diode (LED) or other items that would similarly allow the device to verify its orientation with respect to the mirror.

Figure 2A:
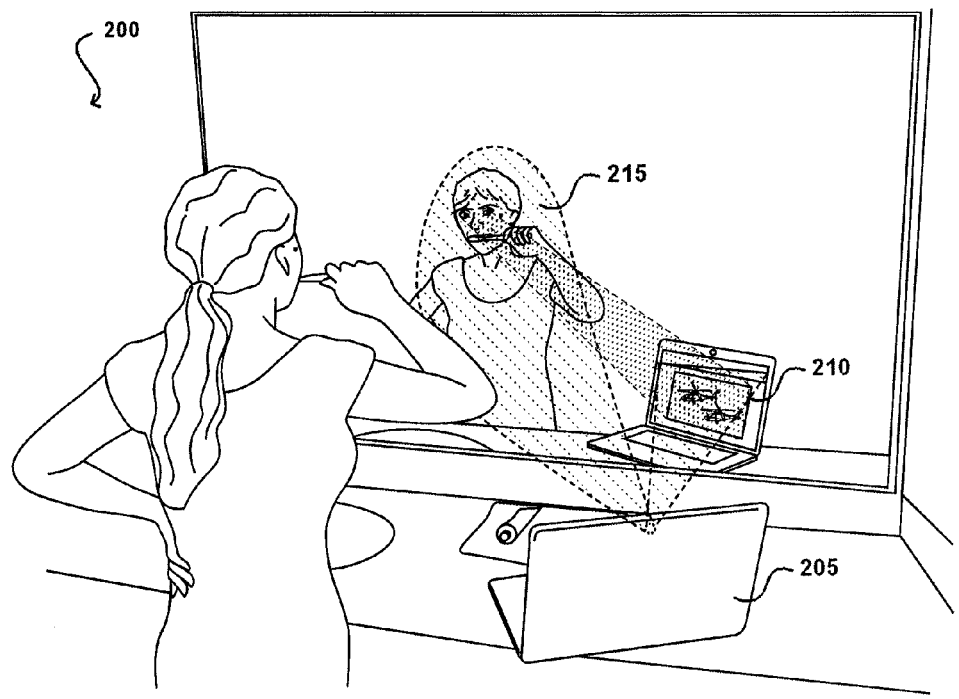
FIGS. 2(a)-2(b) illustrate another example environment in which an electronic device may reverse content displayed on a display screen of the device upon determining that a user of the device is viewing the content through a reflective surface in accordance with various embodiments.
Figure 2B:
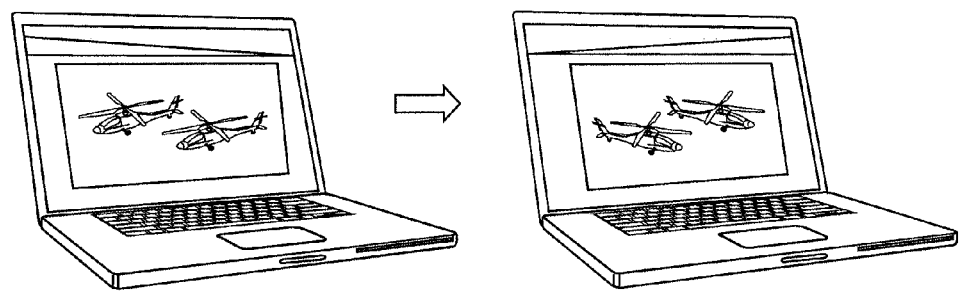

FIGS. 2(a)-2(b) illustrate another example environment 200 in which an electronic device may reverse content displayed on a display screen of the device upon determining that a user of the device is viewing the content via a reflective surface. As mentioned above, some embodiments determine that the user is viewing content (e.g., still images or video images) of the device via a reflective surface (e.g., a mirror) by detecting one or more triggers or triggering events. FIG. 2(a) illustrates another example situation that may cause the device to automatically reverse the content displayed on the display element of the device such that a viewer of a reflection of the display may watch the contents of the device as if the contents were being viewed in its normal left-right orientation.

As mentioned above, some embodiments may perform its determination to reverse the left-right orientation of the content differently. In some embodiments, the device determines to reverse the left-right orientation upon detecting multiple triggers, such as when the device detects a reflection of the user in addition to detecting a reflection of the two-dimensional image. Some embodiments determine that the reflection of the user has been detected by detecting a face and then by determining whether the detected face is a reflection of the user's face (e.g., by using an image recognition algorithm).

In some embodiments, the device uses user information to determine whether the detected face is a reflection of the user's face. The user information includes information about a user, such as asymmetric information or information including facial characteristics and bodily features of a user that may be useful for distinguishing the a frontal-view of the user from the reflection of the user. The device of some embodiments records this information by using various imaging elements on the device. Each device may include user information for more than one user. Some embodiments enable the device to determine whether a captured image is a user's reflection by matching facial characteristics with the user information. For instance, the device may determine that the captured image is a reflection of the user when the device detects a mole on the user's face that is left-right reversed.

In FIG. 2(a), the device 205 determines to reverse the content displayed on the display element upon detection of the user's reflection 215 and the reflection of a two-dimensional image 210. Again, the two-dimensional image may be displayed when the auto-detection mode of the device has been activated. The two-dimensional image in this instance is another example of an image with a particular asymmetrical pattern. Upon detection of the reflection of the user and the reflection of the two-dimensional image (e.g., using a front camera on the device, using an infrared sensor on the device), the device reverses the left-right orientation of the content of the device, such as that shown in FIG. 2(b). The user may then view the content in its proper orientation from the mirror's reflection as the device displays the left-right reversed content.

FIGS. 3(a)-3(d) illustrate an example environment 300 in which an electronic device may reverse content displayed on a display screen of the device upon determining that a user of the device is viewing the content via a reflective surface and then returning the content back to its normal orientation upon determining that the user is viewing the content through direct visual contact with the display screen of the device. Upon activating the auto-detection mode, some embodiments enable the device to automatically reverse the content when the device determines that the user is looking at the content using the mirror's reflection. Further, in some embodiments, the device may automatically return the content to its original left-right orientation when the device determines that the user is looking directly at the display screen of the device without using the mirror's reflection.

Some embodiments determine that the viewer is looking at the content of the device using the reflective surface by using facial recognition—by detecting a face of the user and by determining that the user is looking at the reflective surface. In some embodiments, the device detects the user's face by capturing image information from the device's surroundings. The device then uses image recognition algorithms to determine whether a person's face has been captured within the captured image information. Upon determining that a person's face has been captured, the device determines whether the person is looking at the reflective surface (i.e., the person is facing the mirror instead of the display screen of the device) by analyzing the person's face within the captured image information.

In some embodiments, the device analyzes the person's face within the captured image information by comparing the captured image information to user information previously stored on the device to perform this determination. The user information may include all kinds of information about the user, such as the user's facial characteristics and bodily features, especially asymmetrical information that may be helpful in determining whether the user is facing the device or the mirror, etc. For example, the user information of a particular user may include information such as which side a person typically parts his or her hair, which side of the face has one or more moles, which arm has a tattoo, etc.

The device of some embodiments determines that the user is looking directly at the display screen of the device (i.e., not the reflection of the device through the mirror) when asymmetrical information taken from the captured image information of the user indicates that objects that are typically on one side of the user (e.g., using the user information) is found on the same side (e.g., when the captured image information of the user's face matches the user information to above a threshold percentage). Some embodiments determine that the user is looking at the content through the reflection (i.e., facing the mirror) when the captured image information of the user's face is opposite to the stored user information. Different embodiments may perform this determination of whether the user is facing the device or facing the mirror differently.

Figure 3A:
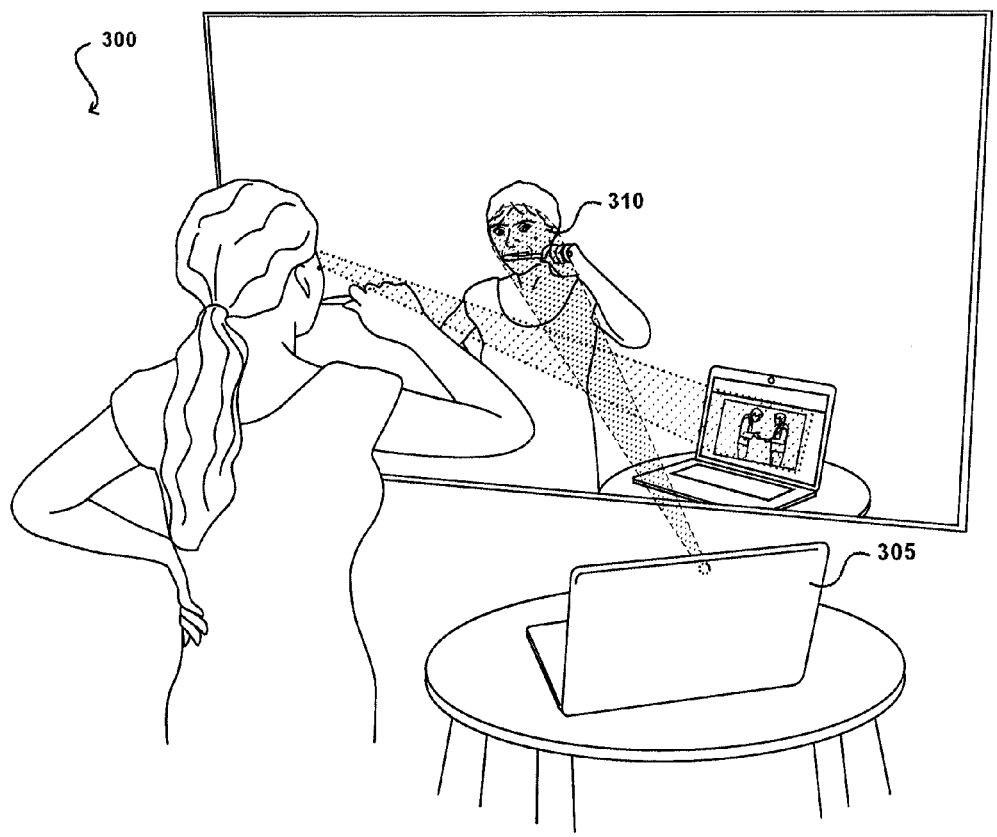
FIGS. 3(a)-3(d) illustrate an example environment in which an electronic device may reverse content displayed on a display screen of the device upon determining that a user of the device is viewing the content through a reflective surface and then returning the content back to its normal orientation upon determining that the user is viewing the content through direct visual contact with the display screen of the device in accordance with various embodiments.
Figure 3B:
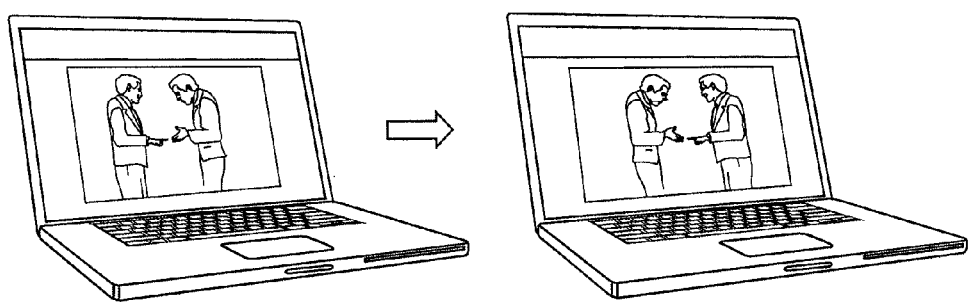

FIG. 3(a) illustrates an example situation that may cause the device to automatically reverse the content on the display element of the device. In this example, the device 305 determines to reverse the content displayed on the display element upon detecting that the user is facing the reflective surface (i.e., the mirror). As mentioned, the device may determine that the user is facing the reflective surface by comparing the detected face (e.g., via a front-camera of the device) with user information (e.g., stored on the device, retrieved from another device). Here, the device has determined that the detected face 310 matches the stored user information beyond a threshold percentage, in this case, indicating that the user is facing the mirror. Therefore, the device performs a left-right reverse of the content displayed on the device, such as that shown in FIG. 3(b), such that the user may view the content in its proper left-right orientation through the mirror.

While some embodiments determine whether the user is facing the mirror or the device by using a facial recognition technique as described above, the device of some embodiments may perform this determination by using other mechanisms. In some embodiments, the device determines whether the user is facing the mirror by detecting a face and by performing infrared (IR) detection. In one embodiment, a video feed is continually analyzed using a head or face detection algorithm. Once a face or head is detected, the device can utilize IR transmitters and receivers to perform IR detection in determining whether the user is substantially facing the device. In some embodiments, the device may perform IR detection without detecting the face or head of the user.

The device of some embodiments includes at least one IR transmitter and receiver (or transceiver) that can emit IR radiation and detect IR radiation reflected from the user. As known in the art, the human retina is a retro-reflector, such that light is reflected back at substantially the same angle in which the light was incident on the retina. The device of some embodiments may determine whether a detected face is a face that is facing the device or facing the mirror by detecting the IR radiation reflected from the detected face, as the IR wavelengths would be reflected differently in the two situations. Certain approaches can utilize IR emission and detection to determine whether a user is facing substantially towards a device or towards a mirror. Examples of such approaches can be found in co-pending U.S. patent application Ser. No. 12/786,297, filed May 24, 2010, entitled "Determining Relative Motion As Input," which is hereby incorporated herein by reference.

Further, the human eye absorbs certain wavelengths, such that light of one wavelength may be reflected by the retina while light of another wavelength may be absorbed by the cornea and/or other portions of the eye, or otherwise not reflected back. The device of some embodiments may use these properties to determine whether the user is facing the mirror or the device since the reflection from the user's retina would be different in the two instances. Some embodiments may therefore compare these results to determine whether the user is facing the device or facing the mirror.

Figure 3C:
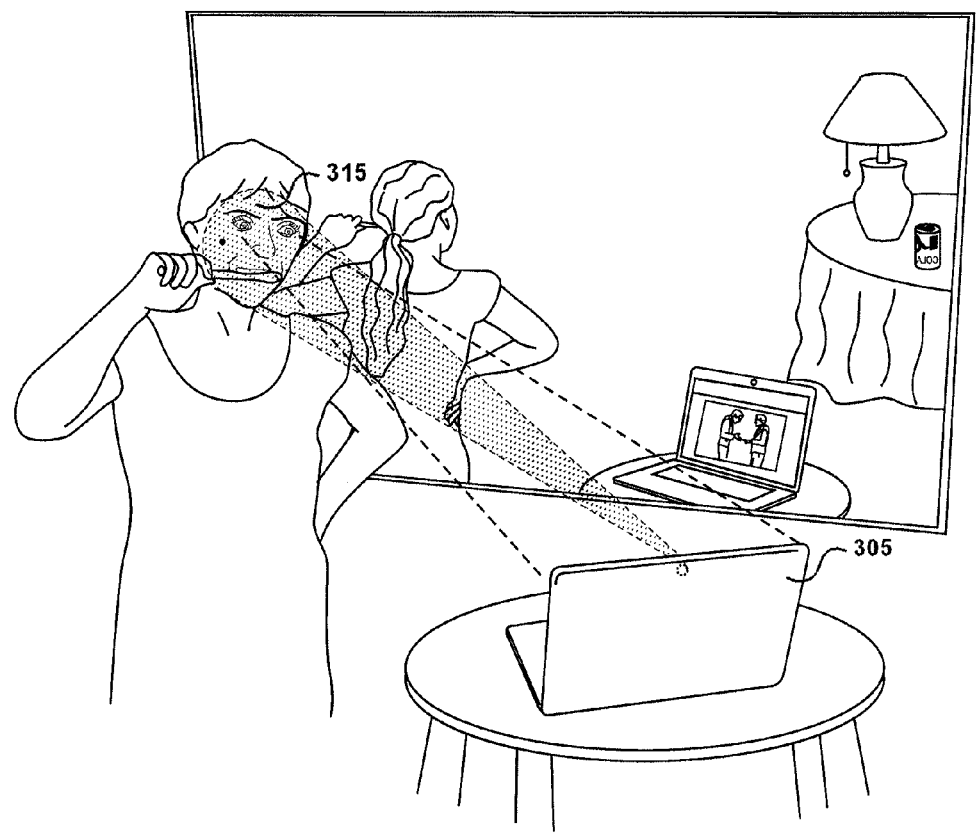
Figure 3D:
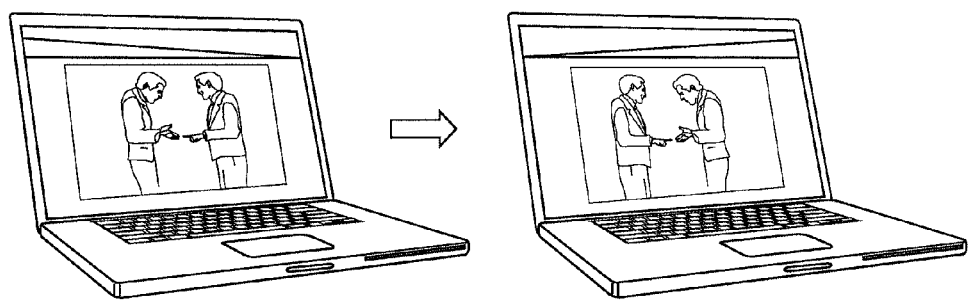

FIG. 3(c) illustrates an example situation that causes the content to automatically return to its normal left-right orientation displayed on the display element of the device. In this example, the device 305 determines to return the left-right orientation of the content to its normal orientation upon detecting that the user is looking directly at the display screen of the device. As mentioned above, the device may determine whether the user is facing the device by comparing the detected face (e.g., via a front-camera of the device) with user information (e.g., stored on the device, retrieved from another device). Here, the device has determined that the detected face 315 is opposite to the stored user information beyond a threshold percentage. Therefore, the device reverses the left-right orientation of the content back to how the content was originally displayed on the display screen of the device, such as that shown in FIG. 3(d).

As mentioned above, the determination of whether the user is reading the content of the device by looking directly at the screen of the device or by looking at the reflection from the mirror may be performed through IR detection. Although devices may use just one type of determination mechanism, some embodiments may perform multiple determinations using different mechanisms to increase the accuracy in the determination. In this example, the device also performs IR detection to determine whether the user is facing the device or facing the mirror. In this example, in addition to detecting the user's face, the device also detects and locates the position of the user's eyes (e.g., by analyzing a captured IR image using an IR sensor and by examining the eyes' reflection of the IR radiation).

In some embodiments, other approaches can be used to determine whether the user is facing substantially towards the device (i.e., looking at the device) or looking at the reflection of the device in the mirror. For instance, upon detecting a face or a head of a user, the device of some embodiments may utilize a relative orientation-determining algorithm to determine whether the person corresponding to the detected face is facing substantially towards the camera. Some embodiments may also use gaze tracking techniques to determine whether the user is facing substantially towards the device or towards the mirror.

In addition to enabling users to look at content in its proper left-right orientation via a reflective surface, some embodiments enable users to take pictures of themselves in front of reflective surfaces (e.g., mirrors). Oftentimes, people want photos of themselves in their current state, but do not have help from others who may take the photo for them or do not want to bother others in taking the photo. In some instances, a user of an electronic device may take a photo of herself by pointing one or cameras on the device at the user herself. However, the user would only be able to hold the device away from the user's face up to a certain distance in accordance with the length of the user's arm, and would be unable to capture much of the rest of the user's body or the user's background. The device of some embodiments therefore enable users to take photos of themselves using the reflection in the mirror. By using the reflection in the mirror, the user has more leeway as to the amount of information (e.g., the user's full body, the background, etc.) that the user wants to capture.

Figure 4A:
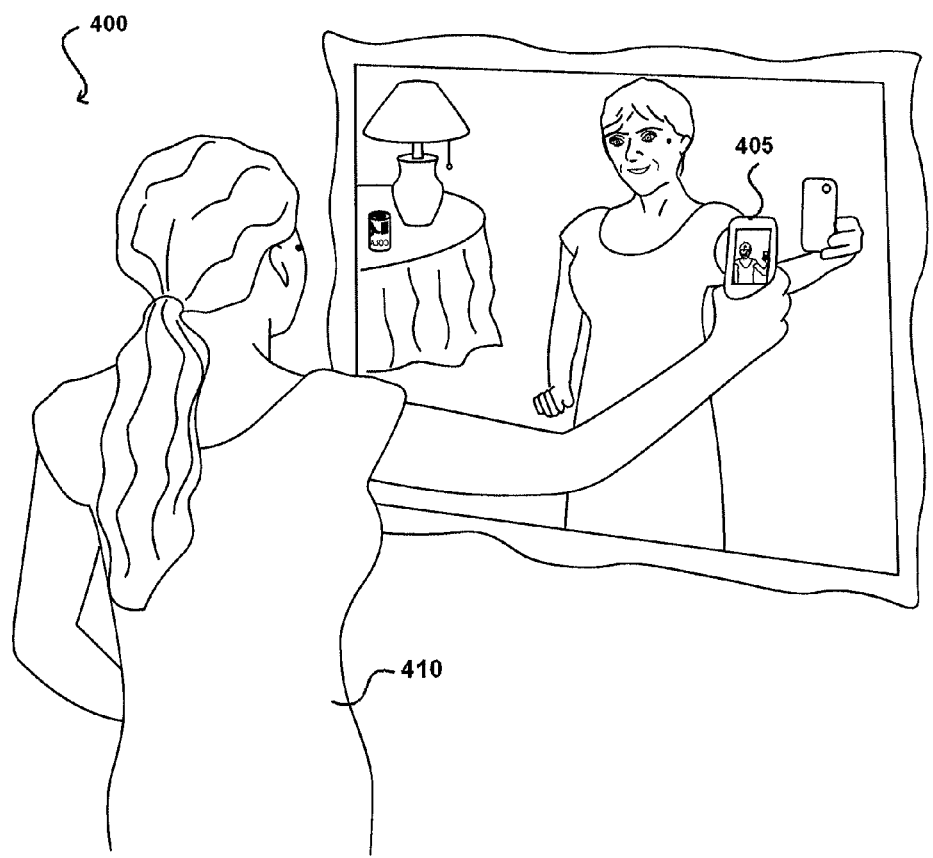
FIGS. 4(a)-4(c) illustrate an example situation of enabling a user of an electronic device to take a picture of the user using the reflection in the mirror in accordance with various embodiments.
Figures 4B, 4C:
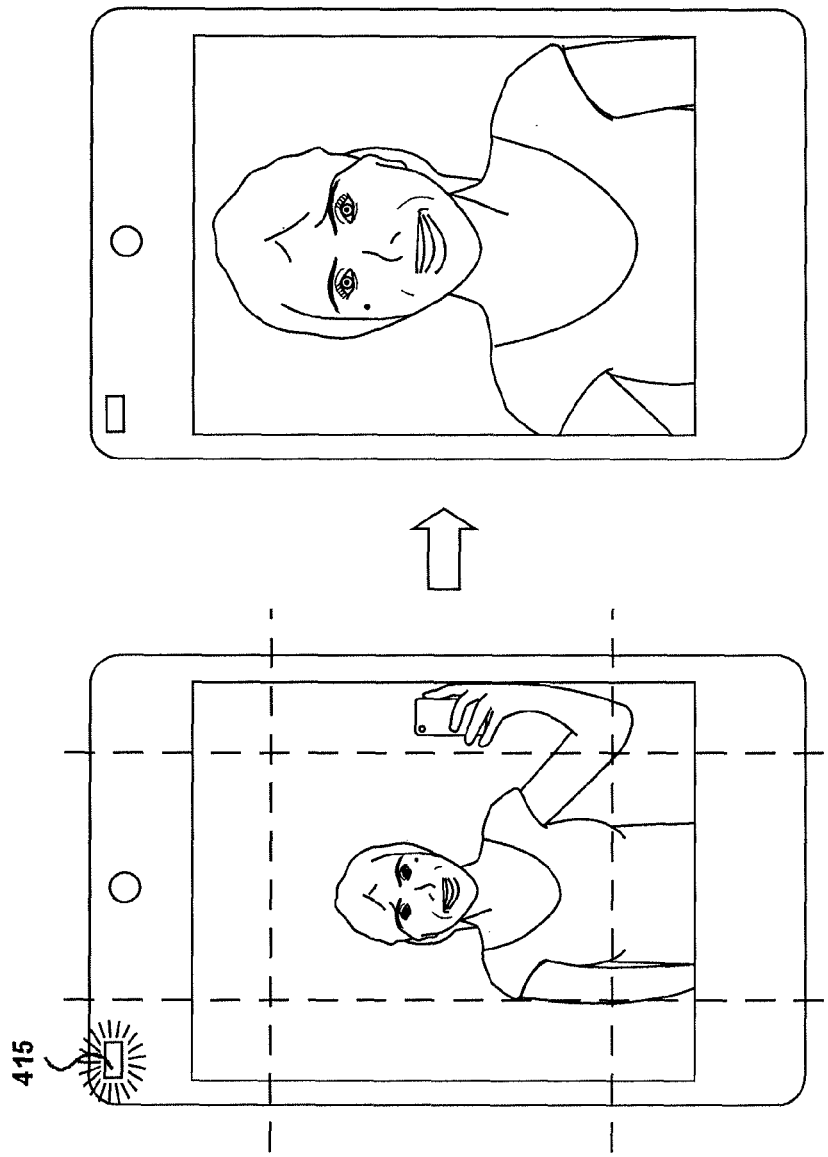

FIGS. 4(a)-4(c) illustrate an example situation 400 of enabling a user 410 of an electronic device to take a picture of the user using the reflection in the mirror. In this example, the user is holding the user's electronic device 405 up with the front camera(s) of the device facing the mirror in an attempt to capture the user's reflection in the mirror. The device of some embodiments may determine that the device is capturing images (e.g., a still image or video images) through a reflective surface (e.g., a mirror) and process the images using image processing algorithms. In some embodiments, the image processing algorithms process the images in such a way that makes the images appear as if they were taken by another.

Some embodiments enable the user of the device to manually activate a mirror mode, indicating to the device that the user will be taking photos or videos of himself or herself using the reflection in the mirror. Upon the images being captured, the device of some embodiments may process the captured images using the image processing algorithms. In some embodiments, the user may activate an auto-detection mode where the device may detect when the user is capturing images using a reflective surface. The device of some embodiments may process the images captured using the reflective surface with a set of image processing algorithms while processing images captured directly from the user (i.e., instead of using the user's reflections) using another set of image processing algorithms that are conventional (e.g., white balancing, focus adjustment, etc.).

In some embodiments, the device detects when the user is capturing images using a reflective surface when the device is in auto-detection mode. Some embodiments may detect when the user is capturing images via a reflective surface by using similar approaches as discuss above. For instance, the device of some embodiments may determine that the user is attempting to capture images using a mirror when the device detects a reflection of a two-dimensional image with a unique pattern, the two-dimensional image being displayed or projected from the device itself. By capturing the reflection of the two-dimensional image using one or more imaging elements (e.g., front cameras, optical lens) of the device, the device of some embodiments determines that the user is attempting to capture images of herself through the mirror.

In another instance, the device may determine that the user is using a mirror to capture the user's reflection (which triggers the mirror mode) when the device detects both a reflection of the two-dimensional image and the user's reflection. As mentioned above, the user's reflection may be detected upon detecting a face (e.g., using imaging elements of the device) and then using facial recognition algorithms to determine whether the detected face is a direct view or a reflection of the user's face. In a further instance, the device may determine that the user is using a mirror to capture the user's reflection by determining that the user is facing the mirror using IR detection. In another instance, the device may determine that the user is using a mirror to capture the user's reflection by flashing one or more blinking markers on the device. In these instances where the mirror mode has been triggered, the device may perform a series of image processing algorithms to make the images appear as if they had been taken in a normal setting (e.g., by another person).

Upon the device determining that the user is using a mirror to capture the user's reflection or upon the mirror mode being triggered, the device of some embodiments provides feedback (e.g., tactile feedback, audio feedback, visual feedback) to the user to direct the user to the field of view of the device (or field of view of camera(s) on the device). The field of view is the area where the user is considered "centered" or within an area where at least a portion of the user will be able to be captured by the device. Providing this feedback enables the user to adjust his or her position (or adjust the device's position/angle) such that the desired body part is captured within the image(s). For instance, the device may flash a red light-emitting diode (LED) when the user's head is centered.

The electronic device may detect or sense the user's position using any suitable approach. In some embodiments, the device may use an imaging element or a sensing mechanism, such as a camera or optical lens to detect the position of the user (or the head and/or eye orientation of the user). For instance, the device may detect the user's face from the background (e.g., based on particular attributes or characteristics of a human face, or based on the difference in shape or color between the user and the background) using one or more cameras of the device, and determine the position of the user's head in the field of view of the camera(s). In another instance, the device may use an IR or heat-sensitive camera, or an optical camera with an adequate lens to distinguish the user's body (e.g., the user's head or torso) from the background to determine the position of the user relative to the camera field of view. In some instances, this approach is particularly useful in low light or night situations.

The device may provide feedback in a number of ways. Some embodiments provide tactile feedback such that, as the user moves towards a more "centered" position, the device vibrates more strongly or at a higher frequency. In some embodiments, the device may flash different colors of LEDs or flash LEDs at different frequencies to convey to the user that the user is becoming more or less "centered". For instance, the device may flash blue when the user is within a threshold distance of being "centered" and flash red when the user is within a narrower threshold distance of being "centered". Some embodiments may also provide audio feedback that beeps more frequently as the user moves farther away from a "centered" position. The device of some embodiments may provide no feedback when the user is not within the field of view at all, but provide some type of feedback when the user is within the field of view but off-center.

In some instances, the device may also provide other indicators that may indicate to the user that certain body parts (e.g., the head, the full body length) are outside the limits or boundaries of the imaging element or the sensing mechanism (i.e., outside the field of view of one or more cameras on the device). Further, in some embodiments, the user may configure the device the method in providing the feedback and the particular body part (e.g., the face) that the user wants "centered". As shown in FIG. 4(b), the LED 415 on the device does not flash but is continuously lighted to indicate to the user that the user is in a centered position.

After the user knows that the user is "centered" according to the various feedback given by the device, the user may proceed to take images (e.g., still or video images) of the user herself. In some embodiments, the user may start taking images by selecting a selectable UI item (e.g., a button or a component coupled to the device) or by setting a standard timer. Some embodiments enable the device to start capturing image(s) upon a gesture performed by the user when the user is ready for the images to be taken. For instance, the device may capture image(s) five seconds after an extended blinking of the eye or two seconds after a nodding of the head, etc.

After capturing the images, some embodiments may then perform a series of image processing algorithms to the captured images. In some embodiments, performing the image processing algorithms removes a portion within the captured images showing the user's device. In order for the final image(s) to look as if the image(s) were taken by another person, the image processing algorithms may locate the image of the device within each of the image(s), determine the respective pixels' coordinates, and replace the color values of those pixels with color values of neighboring pixels (e.g., pixels near the boundary). In some embodiments, the device may recognize a repetitive background pattern and replace the portion in the image where the device is with the background pattern. Removing unwanted elements within an image as if the unwanted element were never captured as a part of the image is well known in the art and will not be discussed in detail here. Further, the image processing algorithm may remove the arm used to hold up the device and reconstruct the arm as being in a different position (e.g., a more natural position of being against the user's body or a position that somewhat mirrors the position of the other arm).

In instances where the user's surrounding does not provide sufficient ambient lighting, the user may activate flash on the device. Without flash, the captured images may be dark and lack visual details, whereas activating flash may provide additional lighting during image capture. However, using flash while image capturing against a reflective surface (e.g., the mirror) may cause the resulting images to be overexposed and/or contain an undesirable flash "glare spot". Therefore, the device of some embodiments removes these negative "flash effects" when flash has been used to capture the images. In some embodiments, the device may capture the user's image (or any object that the user is trying to capture) at least twice: at least once without flash and at least once with flash. The device of some embodiments may then use the image processing algorithm to produce a third image with the negative "flash effects" removed. Some embodiments produce this image by incorporating the visual details and color information from the image taken with flash along with the lack of a "glare spot" from the image taken without flash but which captured an overall appearance of the user. Different embodiments may remove the "flash effect" differently. Furthermore, the image processing algorithm of some embodiment may include further processing techniques such as color correction, white balancing, etc. that may further enhance the captured images. In some embodiments, capturing multiple images with and without flash increases the dynamic range of the color component values. This enables the device to combine the images to produce images with improved quality where the pixels of the images include a wider range of color component values.

In this particular example, the device used by the user to capture images of the user is a smartphone that the user held while taking the image(s). The image processing algorithms in this example removed the images of the smartphone that were originally part of the captured images. Further, the image processing algorithms in this example repositioned the user's arm that was used to hold the device to a position that is against the user's body. The image processing algorithms also removed the effects of activating flash against a mirror by offsetting images of the user taken with and without flash. FIG. 4(c) shows an example of the user's image after performing the various image processing functions on the captured images.

Figure 5:
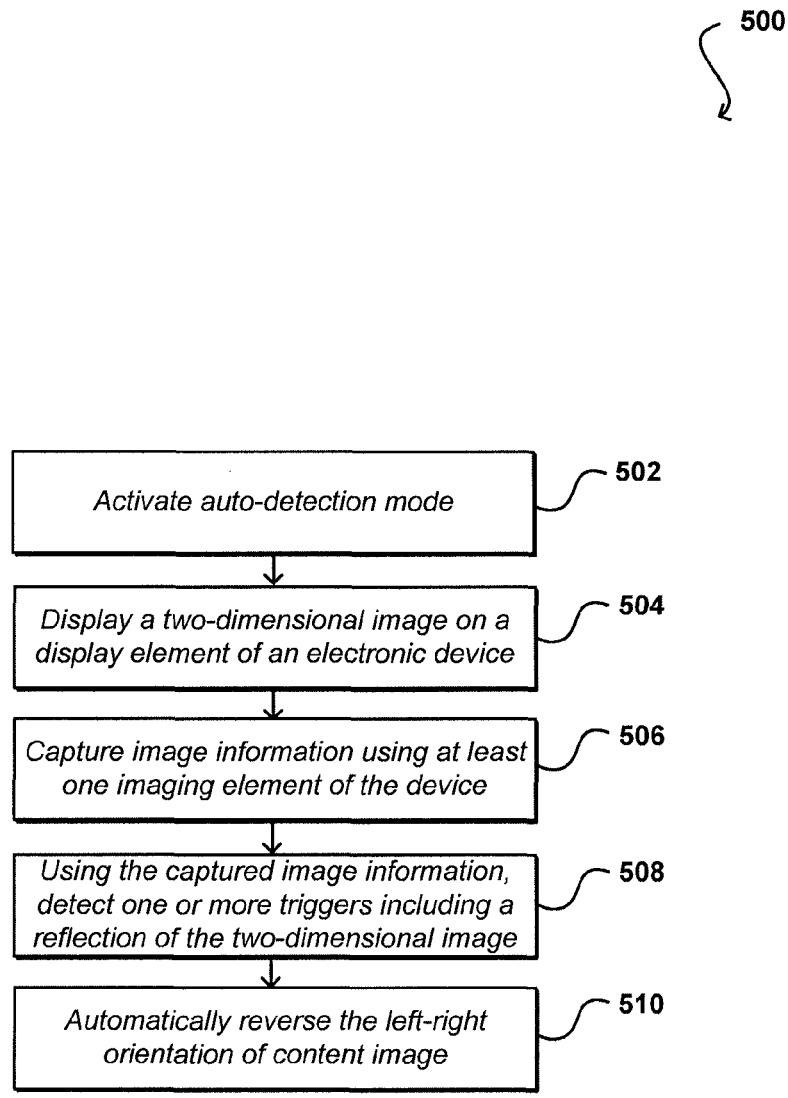
FIG. 5 illustrates an example process for enabling a right-left reversal of content displayed on a display screen of an electronic device in accordance with various embodiments.

FIG. 5 illustrates an example process 500 for enabling a right-left reversal of content displayed on a display screen of an electronic device. It should be understood that, for any process discussed herein, there can be additional, fewer, or alternative steps performed in similar or alternative orders, or in parallel, within the scope of the various embodiments unless otherwise stated. In this example, an auto-detection mode is activated 502 that enables the device to determine whether a user is viewing content of the device via a reflective surface. Some embodiments determine that the user is viewing content of the device via a reflective surface (e.g., a mirror) by detecting one or more triggers. In some embodiments, the trigger may be the detection of one or more blinking markers, such that, upon detection of the trigger, the device may determine that the display screen of the device is being placed against a reflective surface (i.e., substantially parallel and facing each other). Some embodiments determine that the display screen of the device is being placed against a reflective surface upon detecting a reflection of an image/object displayed or projected by the device.

Upon activation of the auto-detection mode, a two-dimensional image is displayed on a display element of the device 504. In some embodiments, the electronic device displays a one- or multi-dimensional image or identifier that includes an image with an asymmetric pattern. The asymmetric pattern enables the device to determine whether the display element of the device has been placed against a reflective surface by detecting and by analyzing the asymmetric pattern. For instance, the device may determine that its display screen is being placed against a reflective surface (i.e., across from and facing) when the detected pattern is left-right reversed from its normal orientation. Some embodiments display one or more blinking lights (e.g., a small square or circle) on the screen of the device or through one or more LEDs on the device instead of or in addition to the two-dimensional image. By performing a spatiotemporal analysis of the blinking lights, the device may determine whether the blinking lights are reversed due to the mirroring effect or due to being reflected off of a reflective surface.

In some embodiments, image information is captured using at least one or more imaging elements of the device 506. The device of some embodiments captures the image information using one or more imaging elements, such as cameras or sensors, on the same side of the device as the display element. Using cameras that are on the same side as the display element enables the device to capture imaging information from areas (e.g., a mirror) onto which content displayed on the display screen may be reflected.

Using the captured image information, the device may detect one or more triggers in order to perform the content-flip or content-reverse. In some embodiments, the one or more triggers needed for the device to perform the content-flip function may be designated by a user or pre-configured by a third-party. In this example, one or more triggers are detected using the captured image information, the one or more triggers including a reflection of the two-dimensional image 508. In some embodiments, the triggers needed to be detected by the device may include multiple triggers, such as a reflection of the two-dimensional image and a reflection of the user. The trigger may also be a determination that the user is facing the mirror in some embodiments. In some embodiments, the trigger may be a detection of one or more blinking lights reversed or inverted. Upon detecting the one or more triggers, the left-right orientation of the content may be automatically reversed 510.

Figure 6:
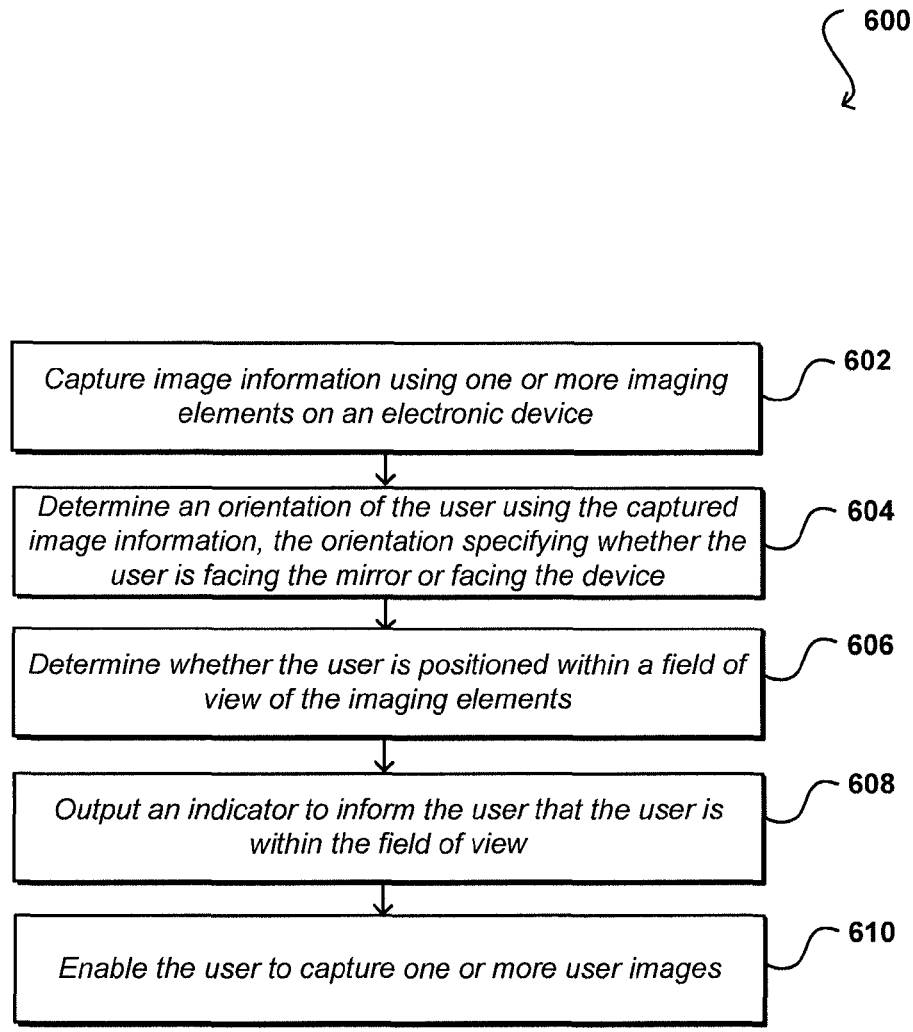
FIG. 6 illustrates an example process for enabling a user to capture images of the user through a reflection in a reflective surface in accordance with various embodiments.

FIG. 6 illustrates an example process 600 for enabling a user to capture images of the user through a reflection in a reflective surface (e.g., a mirror) in accordance with various embodiments. In this example, image information is captured using imaging elements on an electronic device 602. In at least some embodiments, the image information is captured upon activation of a mirror-mode (e.g., through selecting a selectable UI item) of the device or upon activation of an imaging application that continually captures image information in at least a low power state.

The device of some embodiments captures image information of the device's surrounding to enable the device to determine whether the device is facing a reflective surface. In some embodiments, the device determines that the display screen of the device is substantially facing a reflective surface upon detecting one or more triggers. As described above, the one or more triggers may be a reflection of a two-dimensional image that was displayed by the device, a reflection of the user of the device, etc. The device of some embodiments may use the captured image information to detect the one or more triggers.

In some embodiments, an orientation of the user is determined using the captured image information, where the orientation of the user specifies whether the user is facing the mirror or facing the device 604. In addition to enabling the device to determine whether the device is facing a reflective surface, the captured image information enables the device to determine whether the user is facing the reflective surface. In some embodiments, the device assumes that the orientation of the user is facing the reflective surface when the device detects (e.g., from the captured image information) a reflection of a two-dimensional image displayed from the display screen of the device. Some embodiments determine that the orientation of the user is facing the device when the captured image information indicate that the facial characteristics and asymmetries match up with user information stored on the device.

When the determined orientation of the user is facing the mirror, whether the user is positioned within a field of view of the one or more imaging elements is determined 606. In some embodiments, the device may determine whether the user is positioned within a field of view (or viewable range) of the one or more imaging elements (e.g., front camera, back camera) as the range within which images may be captured by the imaging elements may be limited depending on the angle at which the device is held. As the user is determined to be within the field of view of the one or more imaging elements, an indicator is outputted to inform the user that the user is in the viewable range 608. As described above, the indicator may be a visual, audio, or tactile output that informs the user when the user is within the viewable range and/or within a threshold distance of the viewable range (e.g., using different types of outputs).

In some embodiments, the user is then enabled to capture one or more user images at the determined orientation 610. In some embodiments, the device then captures one or more user images that include the user. If the device determines that the image(s) is captured via a reflection in the mirror, the device performs a number of image processing algorithms. One of the image processing algorithms include reversing the left-right orientation of the captured image(s). Other image processing algorithms include removing a flash glare from the captured images, removing an image of the device captured within the captured images, etc. Removing the effects of performing a flash against a mirror can be performed by capturing images with flash and without flash and then processing those images to generate images without the flash glare included in the images captured using flash. Different embodiments may perform these image processing algorithms differently.

Figure 7:
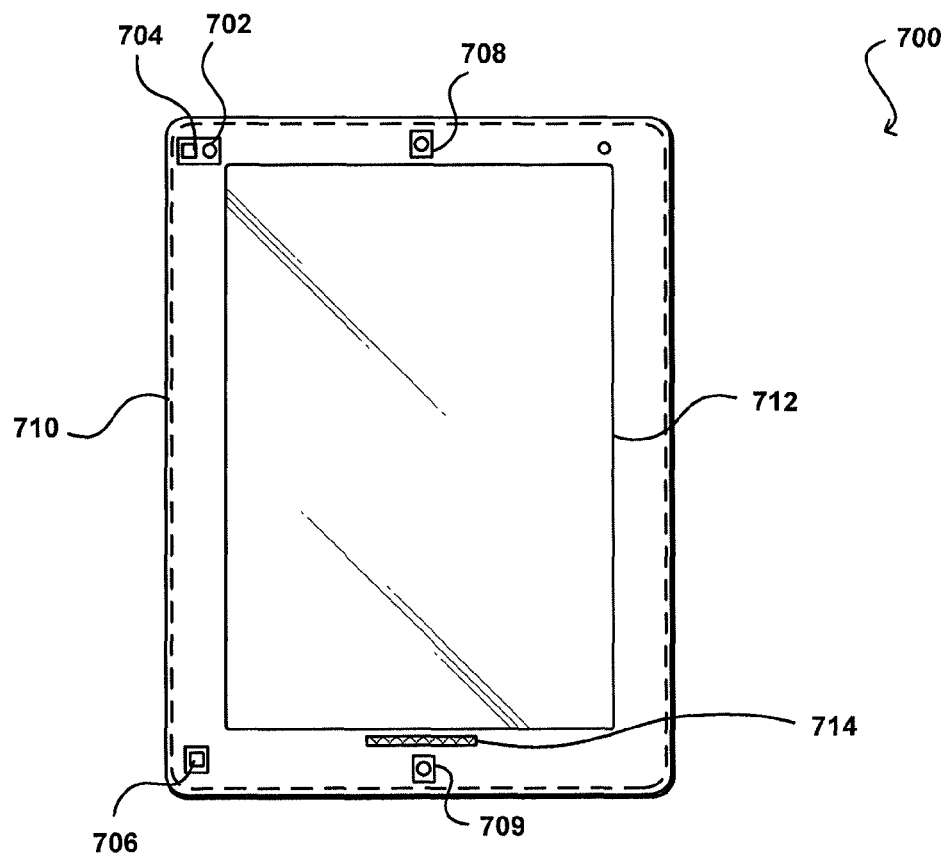
FIG. 7 illustrates an example of an electronic computing device that can be used in accordance with various embodiments.

FIG. 7 illustrates an example of an electronic computing device 700 that can be used in accordance with various embodiments. As discussed, various other types of electronic devices can be used as well within the scope of the various embodiments. This example device includes a display element 712 for displaying information to a user as known in the art.

The example device in FIG. 7 includes an infrared (IR) emitter 702 and two IR detectors 704, 706 (although a single detector and two emitters could be used as well within the scope of the various embodiments). The IR emitter 702 can be configured to emit IR radiation, and each detector can detect the IR radiation reflected from a user (or other such surface or object). By offsetting the detectors in this example, each detector will detect radiation reflected at different angles.

In the example illustrated in FIG. 7, a first IR detector 704 is positioned substantially adjacent to the IR emitter 702 such that the first IR detector will be able to capture the infrared radiation that is reflected back from a surface, such as a viewer's retinas, in a direction that is substantially orthogonal to the capture plane of the detector. The second IR detector 706 is positioned a distance away from the IR emitter 702 such that the detector will only detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. An algorithm can attempt to calculate a position in three-dimensional space (x, y, z) that corresponds to a location equidistant between the user's eyes, for example, and can use this position to track user movement and/or determine head motions. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas. Other embodiments can utilize other approaches for performing head tracking, such as by requiring a user to wear glasses that emit IR radiation from a point source, etc.

In some embodiments it can be preferable to utilize a single emitter and two cameras/detectors when using single wavelength IR (e.g., 940 nm) in two directions, as using a single camera might be cheaper but also requires that images from the different directions be captured at different times. A downside to capturing images at different times is that movement during that period can affect the determination, even for capture frequencies on the order of 30 Hz (or 15 Hz for two cameras to get the same resolution). An advantage to a multi-camera system is that the images can be captured substantially simultaneously, such that movement between images is minimized. A potential downside to such an approach, however, is that there can be optical variations in the images due to the images being captured from two different points of view.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less than 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation simultaneously, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze. Further discussion of using IR light to detect relative eye position can be found in co-pending U.S. patent application Ser. No. 12/786,297, filed May 24, 2010, and entitled "Determining Relative Motion as Input," which is hereby incorporated herein by reference for all purposes.

In some embodiments, it might be useful for a user to participate in a calibration process which accounts for aspects such as the strength of eye reflection from the user, as well as to determine dimensions, calibrate gaze direction determinations, etc. Such an approach also can be useful if a user uses glasses that reduce the reflective capability, etc.

As discussed, other types of input can be provided as well for various purposes. For example, the device can include a touch- and/or pressure-sensitive element 710 around at least a portion of the device 700, such as on the back and/or sides of the device. Using such material, the device is able to determine whether a user is actively holding the device and/or can enable the user to apply input by squeezing at least a portion of the device. The input information could be used to enable the user to trigger a manual authentication, such as to perform a secure unlock of the device. The user can be facing substantially towards the device and squeeze, swipe, or otherwise provide input to a region on the device, at which time the device can determine, through the input, that the user is likely looking at the screen and can use a frame of recently- or subsequently-captured image information to process using a facial recognition or other such algorithm. The device can also determine, through use of the material, which portions of the device are likely covered by the hands of the user. In such an embodiment, multiple cameras and/or IR emitters may be positioned on the device at different locations, and based on where the user is holding the device (i.e., which IR emitters are covered vs. not covered), the system can determine which element(s) to use when capturing images.

The example device 700 in FIG. 7 is shown to also include a microphone 714 or other such audio-capturing device. The device in at least some embodiments can also include multiple audio capture elements that can be used to help determine a relative direction or location of an audio source in two or three dimensions. The device in at least some embodiments can also trigger various actions based upon sound detected by the microphone. For example, if the device detects speech from a person, the device might activate video capture to attempt to locate and/or identify the person speaking.

The device in this example can include one or more imaging elements such as a camera, sensor, or detector that is able to image a user, an object, or a reflection of a user or an object in an environment. This example includes two image capture elements 708 and 709 on the front of the device or on the same general side of the device as a display element, such that when a user is viewing the interface in the display element the imaging element has a viewable area that, according to this example, includes the face of the user. This example also includes at least one image capture element on the back of the device (not shown). It should be understood, however, that image capture elements could also, or alternatively, be placed on the sides or corners of the device, and that there can be any appropriate number of capture elements of similar or different types.

Each image capture element 708 and 709 may be, for example, a camera, a charge-coupled device (CCD) imaging element having a sufficient resolution, focal range and viewable area to capture an image of the user when the user is operating the device, a motion detection sensor, an infrared sensor, or other image capturing technology. It should be understood that image capture can be performed using a single image, multiple images, periodic imaging, continuous image capturing, image streaming, etc. Further, a device can include the ability to start and/or stop image capture, such as when receiving a command from a user, application or other device.

Although embodiments described herein use examples of the viewable area including the face of the user, the viewable area may include other portions of the body such as arms, legs, and hips, among other possibilities. In any case, the viewable area of an imaging element can be configured to obtain image information corresponding to at least a portion of a user operating the device, and if the imaging element is continually (or at least substantially continually) capturing or otherwise obtaining image information, then any movement of the user relative to the device (through movement of the user, the device, or a combination thereof) can cause a position or orientation of at least one aspect of that user within the viewable area to change.

In some embodiments, the device can include capture elements on the sides, back, or corners of the device, or in any other such location, which can capture image information in any appropriate direction around the device. In some embodiments, a device can concurrently image and identify multiple persons in different locations around the device, and track those persons over time using the various elements.

Figure 8:
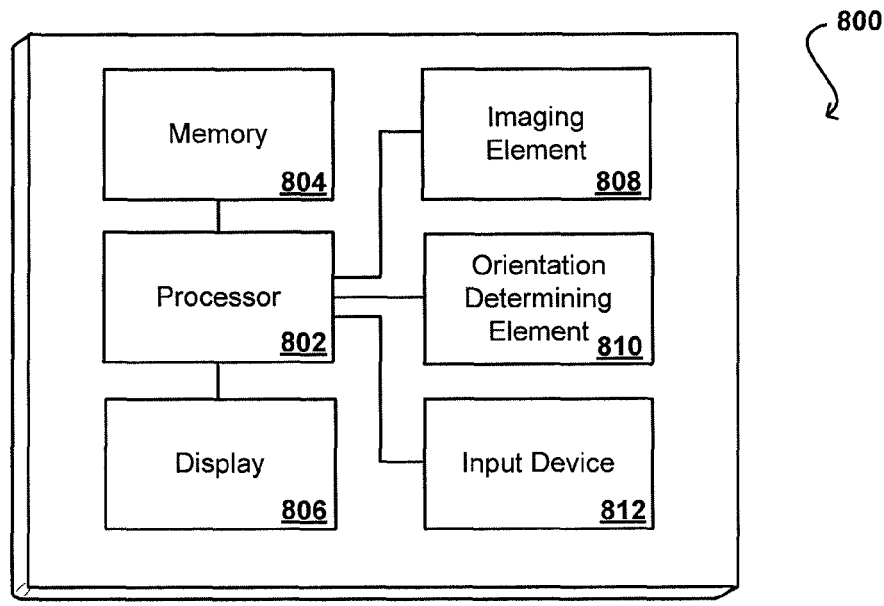
FIG. 8 illustrates a set of basic components of an electronic device such as the device described with respect to FIG. 7.

FIG. 8 illustrates a set of basic components of an example electronic computing device 800 such as the devices described with respect to FIG. 7. While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device 800 typically will include some type of display element 806 (e.g., an LCD element, a touch screen, electronic ink (e-ink), organic light emitting diode (OLED)) operable to display information or image content to one or more users or viewers of the device. The display screen of some embodiments displays information to the viewers facing the display screen (e.g., on the same side of the computing device as the display screen).

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element 810 that is able to determine a current orientation of the device 800. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm. In some embodiments, the orientation-determining element can determine when the device is moving and is likely to produce a blurry image, and can prevent IR pulsing during this period in order to conserve power since the image information will likely not be useful based at least upon the motion of the device.

In some embodiments, the device can include at least one additional input device 812 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information.

In some embodiments, one or more icons or other notifications might be displayed on the device to indicate to the user that auto-detection mode is active, IR illumination is active, or that image recognition is being performed. In some embodiments, a light (e.g., LED) on the device might illuminate in order to notify the user that facial recognition is activated in order to signal to the user that the user should look at the device and remain relatively still until the process can complete. Various other notifications can be used as well as appropriate.

A number of other approaches can be used as well within the scope of the various embodiments. For example, thermal imaging or another such approach could be used to attempt to determine and track the position of at least some aspect of a human user. In many instances the imaging system is desired to be small and cheap enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, can allow these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

Figure 9:
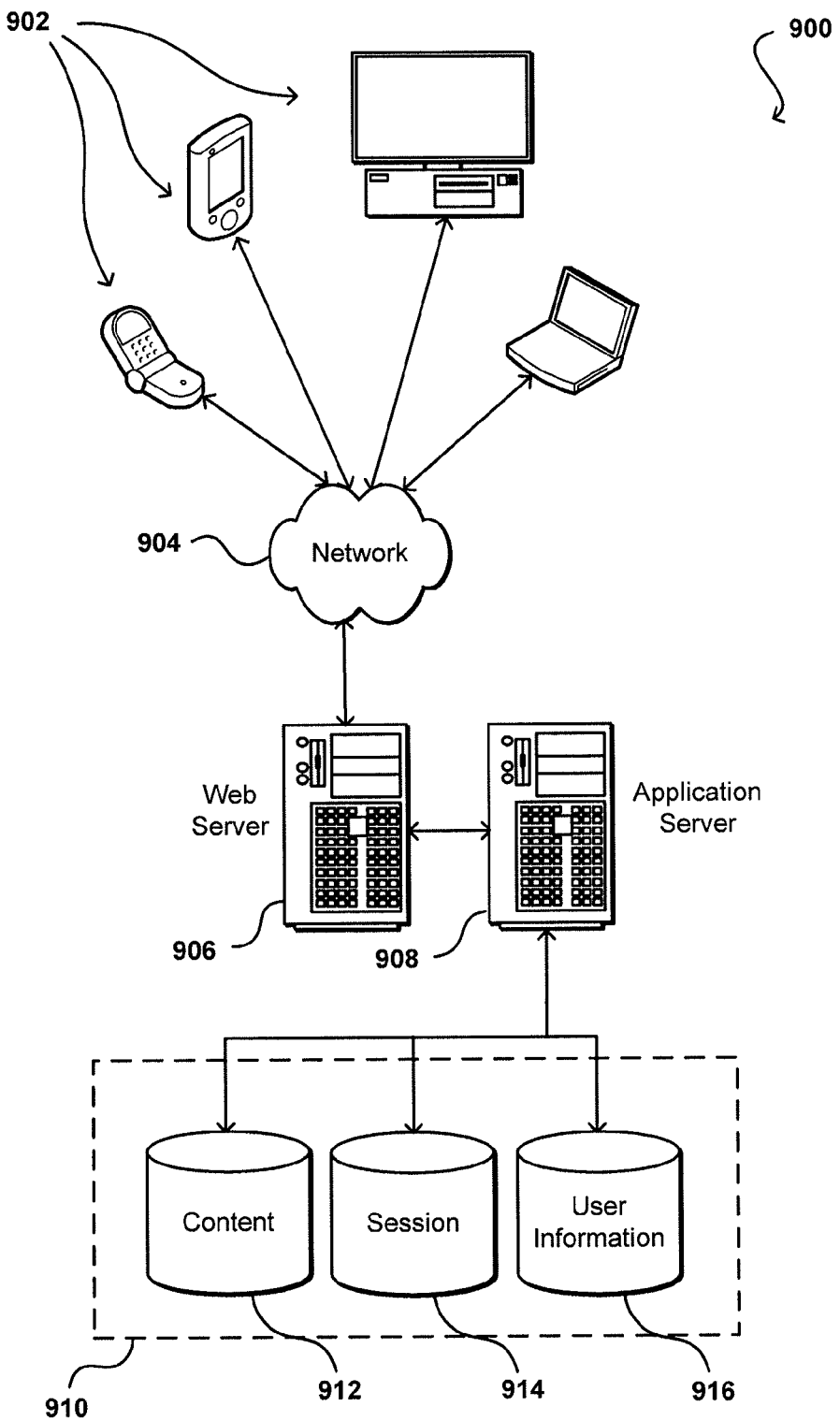
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of reversing a left-right orientation of content displayed on a display element of an electronic device, the method comprising:
   displaying the content on the display element of the electronic device;
   capturing image information using at least one imaging element of the device;
   analyzing the captured image information to detect one or more triggers; and
   automatically reversing the left-right orientation of the content upon the detection of one or more triggers, wherein the detection of one or more triggers indicates that a user of the device is viewing the content, displayed on the electronic device, using a reflective surface.

2. The method of claim 1 further comprising:
activating an auto-detection mode that causes the device to display a two-dimensional image.

3. The method of claim 1 further comprising:
displaying a temporal display that includes at least a first blinking marker and a second blinking marker, wherein the first blinking marker is distinguishable from the second blinking marker, and wherein the one or more triggers includes a detection of an inversion of the first and the second blinking markers.

4. The method of claim 3, wherein the first blinking marker is of a first optical wavelength and the second blinking marker is of a second optical wavelength.

5. The method of claim 3, wherein the first blinking marker has a first brightness level and the second blinking marker has a second brightness level different from the first brightness level.

6. The method of claim 1, further comprising:
displaying a temporal display that includes one or more blinking markers, wherein the one or more triggers includes a detection of the one or more blinking markers in a predetermined temporal pattern.

7. The method of claim 6, wherein the temporal display is displayed using one or more LEDs on the device.

8. The method of claim 1 further comprising:
displaying a two-dimensional image with an asymmetric pattern, wherein the one or more triggers comprises a reflection of the two-dimensional image.

9. The method of claim 1, wherein the one or more triggers includes a detection of a reflection of the user's face.

10. The method of claim 9, wherein analyzing the captured image information comprises:
detecting at least a recognizable portion of the user's face from the captured image information; and
analyzing the recognizable portion of the user's face to determine whether the recognizable portion of the face is the reflection of the user's face,
wherein the analysis includes a comparison of characteristics within the recognizable portion of the user's face with user information that includes asymmetrical characteristics of the user's face.

11. The method of claim 10, wherein the asymmetrical characteristics include at least one of a mole, a dimple, a birthmark, a tattoo on one side of the user's body, a profile of part of the user's face, or other features of the user's face that enables one to identify a right side of the user's face from a left side.

12. The method of claim 1 further comprising:
detecting that the user is facing the electronic device; and
automatically returning the reversed content back to its original left-right orientation upon detection of the user facing the electronic device.

13. The method of claim 1, wherein the analyzing the captured image information comprises:
determining a frontal image of the user's body; and
transmitting IR radiation to the determined image using at least one IR transmitter on the device; and
detecting the IR radiation reflected from the determined image to determine whether the user is facing the device.

14. The method of claim 1, wherein the one or more triggers includes a detection of a reflection of a two-dimensional image and a detection of a reflection of the user.

15. The method of claim 1, wherein the reflective surface is a mirror.

16. The method of claim 1, wherein the electronic device is placed in a position with respect to the reflective surface such that the content displayed from the display element of the device is reflected by the reflective surface.

17. The method of claim 1, wherein the at least one imaging element includes at least one of a front-camera on the device or an infrared sensor on the device.

18. The method of claim 1 further comprising:
automatically returning the left-right orientation of the content back to its original orientation when the device no longer detects the one or more triggers.

19. A non-transitory computer-readable storage medium including instructions that, when executed by at least one processor of a computing system, cause the computing system to perform a method of reversing a left-right orientation of content displayed on a display element of the computing system, the method comprising:
displaying the content on the display element of the electronic device;
capturing image information using at least one imaging element of the device;
analyzing the captured image information to detect one or more triggers; and
automatically reversing the left-right orientation of the content upon the detection of one or more triggers, wherein the detection of one or more triggers indicates that a user of the device is viewing the content, displayed on the electronic device, using a reflective surface.

20. The non-transitory computer-readable storage medium of claim 19, wherein the method further comprises:
activating an auto-detection mode that causes the device to display a two-dimensional image.

21. The non-transitory computer-readable storage medium of claim 19, wherein the method further comprises:
displaying a temporal display that includes at least a first blinking marker and a second blinking marker, wherein the first blinking marker is distinguishable from the second blinking marker, and wherein the one or more triggers includes a detection of an inversion of the first and the second blinking markers.

22. The non-transitory computer-readable storage medium of claim 21, wherein the first blinking marker is of a first optical wavelength and the second blinking marker is of a second optical wavelength.

23. The non-transitory computer-readable storage medium of claim 21, wherein the first blinking marker has a first brightness level and the second blinking marker has a second brightness level different from the first brightness level.

24. The non-transitory computer-readable storage medium of claim 19, wherein the method further comprises:
displaying a temporal display that includes one or more blinking markers, wherein the one or more triggers includes a detection of the one or more blinking markers in a predetermined temporal pattern.

25. The non-transitory computer-readable storage medium of claim 24, wherein the temporal display is displayed using one or more LEDs on the device.

26. The non-transitory computer-readable storage medium of claim 19, wherein the method further comprises:
displaying a two-dimensional image with an asymmetric pattern, wherein the one or more triggers comprises a reflection of the two-dimensional image.

27. The non-transitory computer-readable storage medium of claim 19, wherein the one or more triggers includes a detection of a reflection of the user's face.

28. The non-transitory computer-readable storage medium of claim 27, wherein analyzing the captured image information comprises:
  detecting at least a recognizable portion of the user's face from the captured image information; and
  analyzing the recognizable portion of the user's face to determine whether the recognizable portion of the face is the reflection of the user's face,
  wherein the analysis includes a comparison of characteristics within the recognizable portion of the user's face with user information that includes asymmetrical characteristics of the user's face.

29. The non-transitory computer-readable storage medium of claim 28, wherein the asymmetrical characteristics include at least one of a mole, a dimple, a birthmark, a tattoo on one side of the user's body, a profile of part of the user's face, or other features of the user's face that enables one to identify a right side of the user's face from a left side.

30. The non-transitory computer-readable storage medium of claim 19, wherein the method further comprises:
  detecting that the user is facing the electronic device; and
  automatically returning the reversed content back to its original left-right orientation upon detection of the user facing the electronic device.

31. The non-transitory computer-readable storage medium of claim 19, wherein the analyzing the captured image information comprises:
  determining a frontal image of the user's body; and
  transmitting IR radiation to the determined image using at least one IR transmitter on the device; and
  detecting the IR radiation reflected from the determined image to determine whether the user is facing the device.

32. The non-transitory computer-readable storage medium of claim 19, wherein the one or more triggers includes a detection of a reflection of a two-dimensional image and a detection of a reflection of the user.

33. The non-transitory computer-readable storage medium of claim 19, wherein the reflective surface is a mirror.

* * * * *